1,900,108

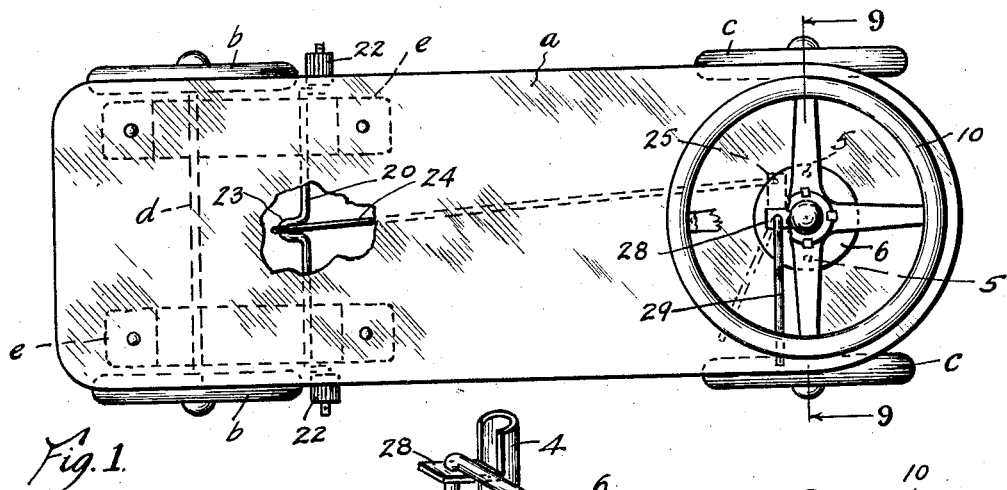
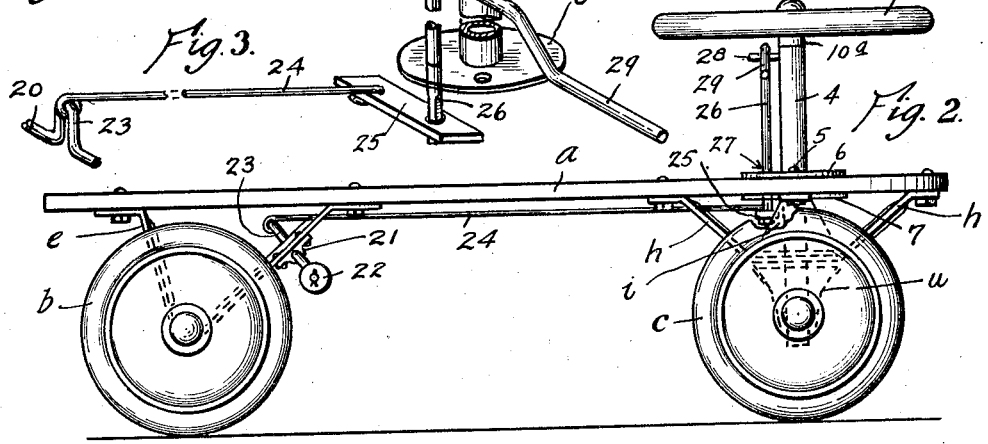
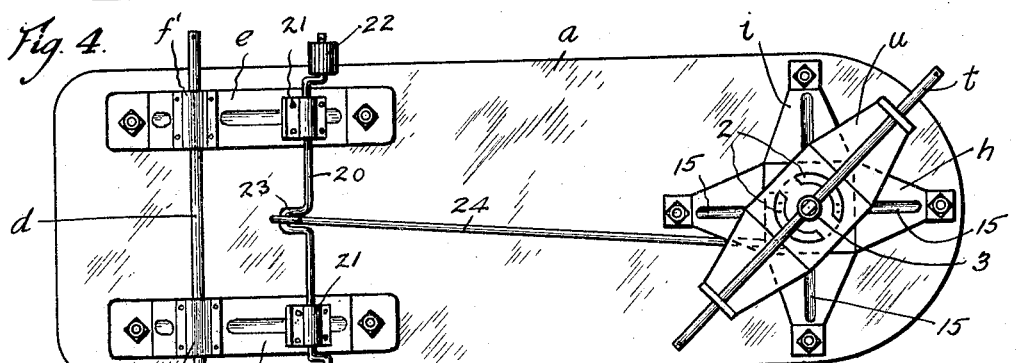
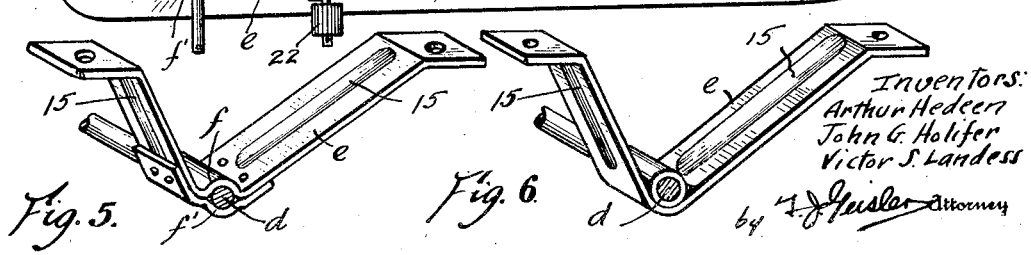

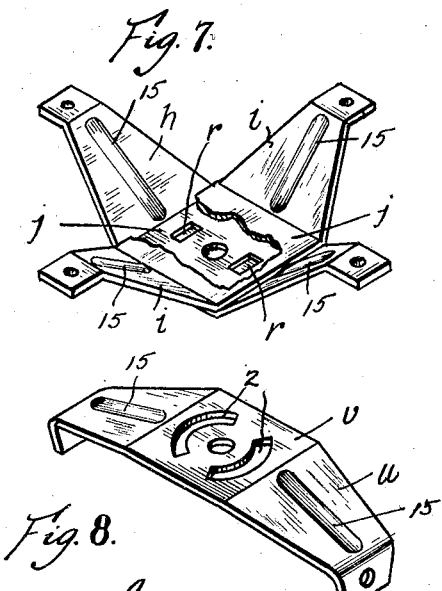
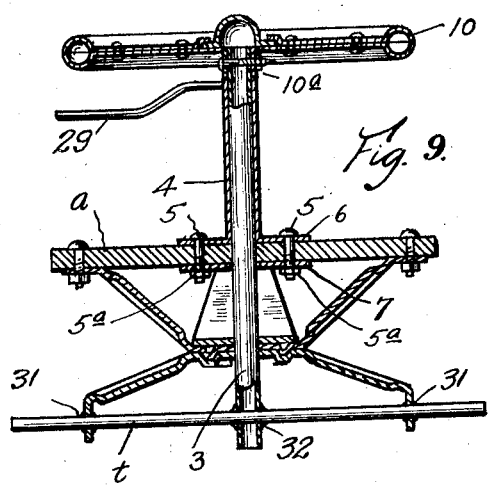
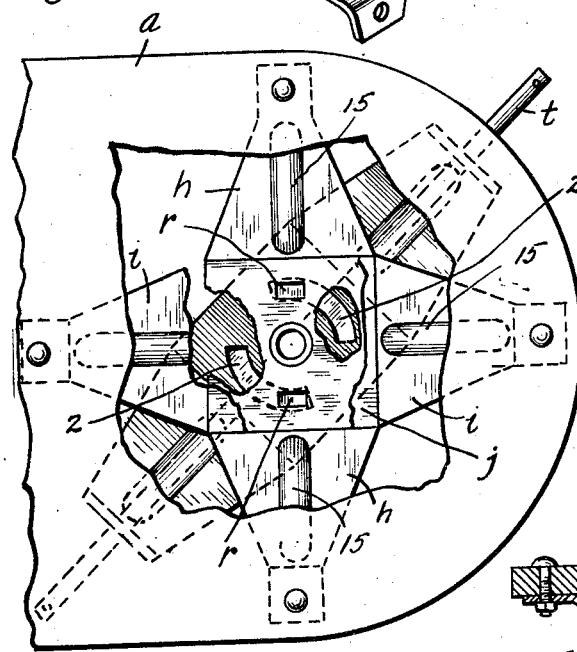
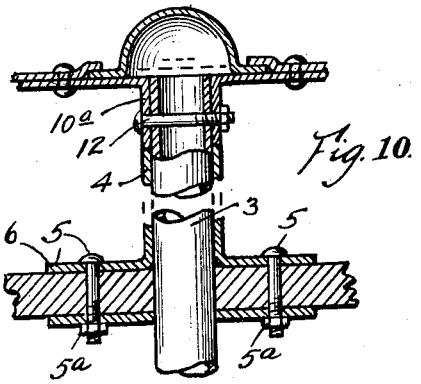
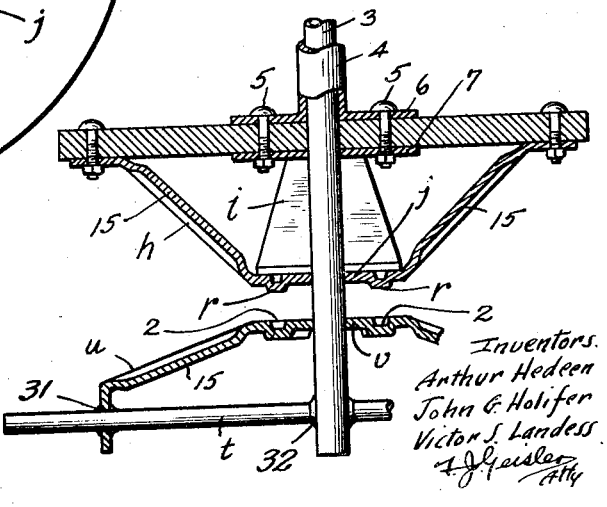

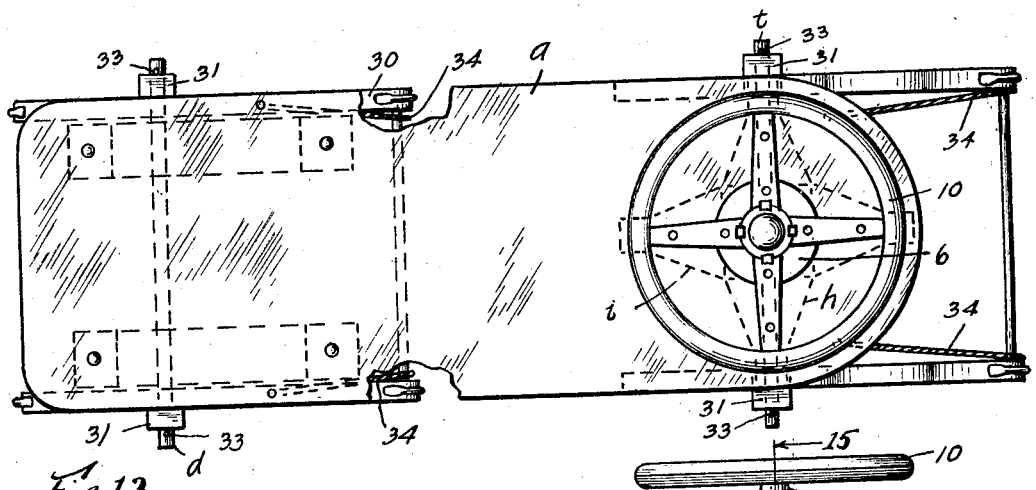
Fig. 13.
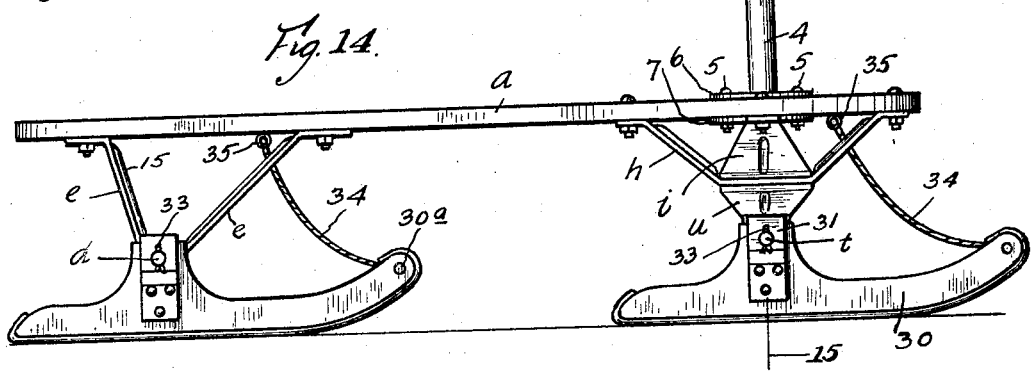
Fig. 14.
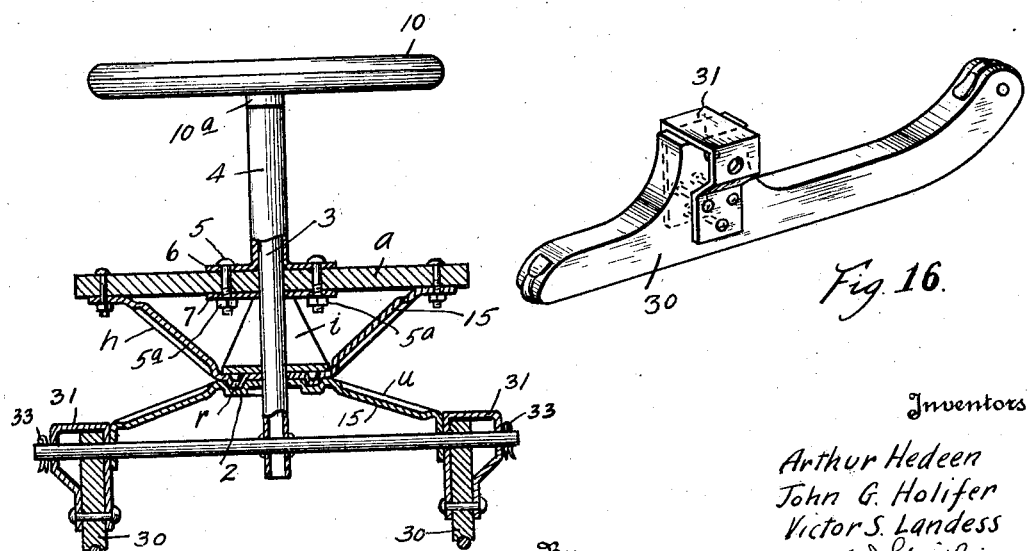
Fig. 15.
Fig. 16.
Inventors
Arthur Hedeen
John G. Holifer
Victor S. Landess
Attorney Patented Mar. 7, 1933

UNITED STATES PATENT OFFICE

ARTHUR HEDEEN, JOHN G. HOLIFER AND VICTOR S. LANDESS, OF PORTLAND, OREGON, ASSIGNORS TO BARRY CERF, OF PORTLAND, OREGON, TRUSTEE

COASTER WAGON

Application filed April 7, 1931. Serial No. 528,318.

Our invention has for its object the providing of a coaster wagon convertible into a bob sled. One of the principle objects of our invention is to provide a simple and compact, strongly built coaster wagon adapted to withstand severe usage; at the same time to keep the cost of the coaster wagon low.

The coaster wagons as heretofore built have within our observation, become quickly broken, principally because not sufficient attention has been given to a strong and practical construction, particularly with respect to the steering means and the means connecting the axles to the wagon body.

Therefore a particular object of our invention is to provide a coaster wagon provided with a steering wheel directly and firmly attached to the axle of the front or steering ground wheels, and so braced and supported by the wagon body as to be capable of supporting the weight imposed upon it by a child holding on to the wagon while kneeling upon the wagon to push it along with one foot, as is usually done.

A further object of our invention resides in providing for the steering of the coaster, strong devices including a steering wheel whose diameter approximately coincides with the width of the wagon board, in order to render the wagon easy to steer, to give the child a firmer support while holding on to the steering wheel, and to prevent too quick turns of the front or steering ground wheels by requiring a relatively large amount of movement of the steering wheels in order to turn the ground wheels to any extent.

A still further object of our invention is to provide a coaster wagon having a simple but efficient brake mechanism, comprising an operating lever conveniently located adjacent the steering wheel.

A still further object of our invention is to provide a coaster wagon provided with positive means for preventing the steering ground wheels from being turned more than thirty degrees approximately on each side, thereby to further prevent the said wheels from being turned so sharply as to upset the wagon.

A further object of our invention is to provide a coaster wagon adapted to be readily coverted into a bob sled by the removal of the wheels and the substitution therefor by sled runners.

These and other incidental features of our invention, and the details of construction are hereinafter fully described with reference to the accompanying drawings:

In the drawings:

Fig. 1 shows a plan view of our coaster wagon;

Fig. 2 shows a side elevation of the same;

Fig. 3 shows the details of the brake mechanism removed from the wagon body;

Fig. 4 shows a plan view of the underside of my coaster wagon and further illustrates the details of construction;

Figs. 5, and 6 show, respectively, perspective views of different forms of brackets for the rear wheels removed from the wagon body;

Fig. 7 shows a perspective view of the crossed bolster members of the front axle, removed from the wagon body;

Fig. 8 shows a similar perspective view of the axle bolster member secured to the front axle;

Fig. 9 shows a section taken on the line 9—9 of Fig. 1 and illustrates in detail the construction of the steering post and tubular supporting standard;

Fig. 10 shows the same in a similar fragmentary section, but in greater detail;

Fig. 11 shows a fragmentary plan view of the front end of our coaster and illustrates in broken lines the position assumed by the front axle when being turned;

Fig. 12 shows an enlarged fragmentary section also taken on the line 9—9 of Fig. 1 and illustrates the relative arranged bolster members and the means limiting the rotation of the front axle;

Fig. 13 shows a plan view of our coaster wagon similar to Fig. 1 except that the ground wheels have been substituted by sled runners;

Fig. 14 shows a side elevation of the same;

Fig. 15 shows the section taken on the line 14—14 of Fig. 13 and illustrates the details of construction of the front axle, steering post, and brace members; and Fig. 16 shows a perspective view of one of the sled runners.

Referring now to the Figs. 1 to 12, our coaster wagon comprises a body *a* having front and rear wheels *b, c*, respectively. The rear wheels *b* are rotatably mounted on an axle *d*, secured in the apices of a pair of longitudinally arranged dihedral brackets *e*, secured to the underside of the body *a*, see Figs. 2 and 4. Fig. 5 shows the axle *d* secured to the brackets *e* by forming a concave recess *f* in the apex of the brackets for receiving the axle *d* and holding in place by a plate *f'* riveted or otherwise secured thereto. Fig. 6 shows the axle secured in the inner side of the apex of the bracket by spot welding or the like.

Crossed dihedral brackets *h, i* constituting a stationary bolster member are secured to the underside of the wagon body *a* adjacent the front end, see Figs. 4, 9 and 10, to which the front steering wheels are attached. The said brackets *h, i* are arranged normal to each other, see Fig. 7, and transversely and longitudinally of the wagon body, respectively. The apices of the said brackets *h, i*, are flattened as at *j* and provided with downwardly extending and oppositely arranged projections *r*, preferably formed by stamping from the upper side.

The front wheels *c* are rotatably mounted upon an axle *t*, secured in a lower bolster member or bracket *u*, see Fig. 8, flattened, as at *v*, and adapted to bear against the flattened portions *j* of the brackets *h, i*. The bolster member *u* is welded to the axle *t* at its ends, as at 31, to prevent the bolster from spreading or flattening under any heavy weight it may be required to support. The portion *v* of the bolster member *u* is provided with oppositely arranged arcuate recesses 2 formed preferably by stamping from the upper side, of approximately sixty degrees each extending an equal distance on each side the longitudinal center of the wagon body. The said recesses are adapted to receive the projection *r* of the brackets *h, i*. The said brackets *e, h, i* and *u* are ribbed, as at 15, for strength.

A vertically arranged tubular steering post 4 provided with a base flange 6 of substantial diameter is bolted upon the front end of the wagon body *a* by bolts 5 extending thru the wagon body. An annular bearing plate 7 is provided on the underside of the body against which nuts 5a threaded on the bolts 5 bear.

The tubular steering post 4 houses a vertical steering shaft 3, rigidly secured on the longitudinal center of the axle 4 in a transverse bore 32. The steering shaft 3 extends upwardly through the bolsters member and the wagon body *a*, and thus serves as the king pin for the front steering wheels and the projections *r* riding in the arcuate recesses 2, limit the steering movement of the front wheels *c*, to approximately thirty degrees on each side and serve to prevent the steering wheels from being turned so sharply as to upset the wagon, see Fig. 11.

A steering wheel 10, of a diameter equal approximately to the width of the body *a* is secured rigidly to the upper end of the shaft 3 and arranged so that its hub 10a bears upon and is supported by the said tubular post 4. As shown in Fig. 10, the hub 10a of the steering wheel 10 is secured to the shaft 3 by a bolt 12 and is spaced from the said shaft so as to receive the upper end 4a of the tubular post 4 between it and the hub 3a. By these means the weight of a child bearing upon the wheel is supported by the post 4 and not by the axle *f*, as would be the case were the post 4 not provided.

Further, by providing a steering wheel approximately equal to the width of the wagon body, it is of such size as to render the wagon easy to steer by requiring a relatively large amount of the movement of the steering wheel to turn the ground wheels to any extent.

A brake mechanism is provided, see Figs. 3 and 4, comprising a transversely arranged brake shaft 20, rotatably secured to the brackets *e*, in bearings 21, and provided with offset ends carrying friction rollers 22, adapted to bear against the rims of the wheels *b* and thus create a braking force thereupon. The shaft 20 is provided with a central crank sections 23, to which is connected a rod 24 extended forwardly of the wagon body and pivotally secured to a lever arm 25, rigidly fastened to the lower end of a brake post 26 extending upwardly through and journaled in the wagon body *a* as at 27, and in a laterally extending portion 28 of the tubular post 4. The upper end of the brake post 26 is formed to constitute a lever arm 29.

Referring now to Figs. 13 to 16 inclusive, we have illustrated how our coaster wagon is convertible into a bob sled by the substitution of sled runners 30 for the wheels *b* and *c* before described.

The sled runners 30 are provided with journal bearings 31 adapted to be mounted on the front and rear axles *d* and *f* to be held in place by suitable fastening means, as a cotter pin 33, or the like.

Chains 34 may be provided, connected to the tips 30a of the sled runners and to the under side of the wagon body *a* in eyelets 35, so that when the sled is lifted off the ground, the runners will not swing free.

We claim:

1. In a coaster wagon the combination of a tubular steering post provided with a base flange mounted on the wagon bed, a plate on the underside of said wagon bed under said flange, fastening elements extending thru said flange and plate, a steering shaft rotatable in said post, a manually operated steering member mounted on said shaft, the steering shaft extending below the wagon bed and provided with a transverse bore, a steering axle extending thru and secured in said bore, upper and lower companion angular bolster plates having lateral arms, respectively, the upper of said bolster plates secured to the underside of the wagon bed, the lateral arms of the lower bolster plate extending and secured to the axle close to its extremities, said companion bolster plates provided with broad bearing faces, means preventing the spreading of the lower bolster plate on the axle, means preventing rotation of the steering axle to a degree tending to cause the weight of the rider to induce sidewise tilting of the wagon.

2. In a coaster wagon the combination of a tubular steering post mounted on the wagon bed, a steering shaft rotatable in said post, a manually operated steering member mounted on said shaft, the steering shaft extending below the wagon bed and provided with a transverse bore, a steering axle extending thru and secured in said bore, upper and lower companion angular bolster plates having lateral arms, respectively, the upper of said bolster plates secured to the underside of the wagon bed, the lateral arms of the lower bolster plate extending and secured to the axle close to its extremities, said companion bolster plates provided with broad bearing faces, means preventing the spreading of the lower bolster plate on the axle, means preventing rotation of the steering axle to a degree tending to cause the weight of the rider to induce sidewise tilting of the wagon.

3. In a coaster wagon the combination of a tubular steering post mounted on the wagon bed, a steering shaft rotatable in said post, a manually operated steering member mounted on said shaft, the steering shaft extending below the wagon bed and provided with a transverse bore, a steering axle extending thru and secured in said bore, upper and lower companion angular bolster plates having lateral arms, respectively, the upper of said bolster plates secured to the underside of the wagon bed, the lateral arms of the lower bolster plate extending and secured to the axle close to its extremities, said companion bolster plates provided with broad bearing faces, means preventing the spreading of the lower bolster plate on the axle, means included in said bearing faces preventing rotation of the steering axle to a degree tending to cause the weight of the rider to induce sidewise tilting of the wagon.

4. In a coaster wagon the combination of a tubular steering post mounted on the wagon bed, a steering shaft rotatable in said post, a steering wheel carried by said shaft, the latter extending below the wagon bed, a steering axle rigidly carried by the lower end of the steering shaft, complementary angular bolster plates arranged normal to each other, supporting the wagon bed on the axle, the extremities of one of said bolster plates bearing on and secured to the extremities of the axle.

ARTHUR HEDEEN.
JOHN G. HOLIFER.
VICTOR S. LANDESS.